Patented Oct. 17, 1950

2,525,784

UNITED STATES PATENT OFFICE 2,525,784

PROCESS FOR EXTRACTING ALKALOIDALS FROM PLANTS WITH AQUEOUS ALUMINUM SULFATE

Louis Feinstein, Hyattsville, Md., and Patrick J. Hannan, Washington, D. C., dedicated to the free use of the People in the territory of the United States No Drawing. Application September 2, 1949, Serial No. 113,894

6 Claims. (Cl. 260—291)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

We hereby dedicate the invention herein described to the free use of the people in the territory of the United States to take effect on the granting of a patent to us.

This invention relates to a process for extracting the alkaloidal content of plant materials, especially the alkaloids of species belonging to the Solanaceae and Chenopodiaceae families, but is not limited to these only.

The alkaloids are present throughout the vegetable world, but are found chiefly in certain orders of the dicotyledonous plants. Alkaloidal plants seldom have only a single alkaloid. The alkaloids are found in all the parts of the plant. They never exist in the free state in the plant, being in union with acids, such as oxalic acid, malic acid, succinic acid.

In the conventional extraction of alkaloids from plants the plant material is cut into fine pieces, which are lixiviated with acidified water in a conical vat tapering towards the bottom. At the bottom outlet a layer of filtering medium such as glass-wool is often placed. The acidified water gradually sinks through the plant material under extraction.

An object of this invention is to obtain alkaloids in a form useful for many purposes without using acids or bases, alone or in combination with organic solvents. By the use of this invention the alkaloids of plant materials can be obtained in a water solution suitable for use as such or as a source for obtaining pure alkaloids free of non-alkaloidal plant materials. Only plant material soluble in aluminum sulfate-water solution is present with the alkaloids in the filtrate, thus eliminating many plant components not soluble in this medium.

In accordance with this invention the plant materials, such as leaves, twigs, stems, branches and roots, are thoroughly ground in machines known as wood hogs. These machines are adjusted to produce a fine sawdust suitable for thorough extraction with solvents. The solvent mixture used is a water solution of aluminum sulfate. The quantity of solvent needed for extraction can be varied but we prefer to use for each kilogram of ground plant material three kilograms of water containing fifty grams of aluminum sulfate per kilogram.

The ground plant material, having been thoroughly mixed with the water solution of aluminum sulfate, is allowed to stand twenty-four hours or longer to allow complete penetration of the solvent into the cells. The tank or conical vat holding the mixed material should be large enough to allow a liquid layer of solvent above the solvent saturated plant material in the tank.

At the completion of the extraction time it is necessary to remove the solvent from the extracted plant material. This can be done by simple filtration on a filter pad, by cylinder filters or by a series of filter pads in a filter press. The extract still left in the filtered plant material can be further removed by water washing but the wash should not be mixed with the original extract because of the dilution that would occur unless the extract is to be vacuum distilled to concentrate the alkaloids by water removal. The filtrate now contains the alkaloids which were in the plant material. The best length of time for extraction is readily determined for each plant material.

The process described was used successfully at room temperature and at the boiling temperature of the aqueous solution of aluminum sulphate. The process described applied to the plant *Nicotiana glauca* resulted in an aqueous solution of the alkaloid anabasine and applied to the plants *Nicotiana ripanda* and *Nicotiana tabacum* resulted in aqueous solutions of the nicotine alkaloids respectively.

A common use to which aqueous nicotine solutions are put is as an insect spray, to plants.

Having thus described our invention, we claim:

1. A process for obtaining an aqueous solution containing alkaloids by direct extraction of alkaloidal plant materials, comprising mixing said plant materials with an extractant essentially comprising a dilute aqueous solution of aluminum sulfate, in the ratio of about 1 kilogram of ground plant material, about 3 kilograms of water and about 50 grams of aluminum sulfate of the formula $Al_2SO_4.18H_2O$, allowing the solution to penetrate the cells to remove the alkaloids, and removing the said extractant, which at this stage essentially comprises an aqueous solution of the alkaloids containing aluminum sulfate, from the plant material.

2. The process of claim 1 in which the plant material is taken from the genus Nicotiana.

3. A process for obtaining an aqueous solution containing alkaloids by direct extraction of alkaloidal plant materials, comprising mixing said plant materials with an extractant essentially comprising a dilute aqueous solution of aluminum sulfate, more than sufficient aqueous solution being employed to saturate said plant material, the excess providing a body of extractant in which the alkaloids dissolve, and separating the plant materials from the body of extractant, the extractant at this stage essentially comprising an aqueous solution of the alkaloids containing aluminum sulfate.

4. The process of claim 3 in which the plant material is of the species taken from the group of Solanaceae and Chenopodiaceae.

5. A process of direct extraction of alkaloids from plant materials in which no acids, bases, and organic solvents are employed in the plant extraction step, comprising: maintaining the ground plant material in contact with a greater amount by weight of a body of aqueous aluminum sulfate solution until the alkaloids are dissolved therein, and separating the plant material from the resulting aqueous solution of alkaloids containing aluminum sulfate.

6. The process of claim 5 in which the plant is *Nicotiana tabacum*.

LOUIS FEINSTEIN.
PATRICK J. HANNAN.

REFERENCES CITED

The following references are of record in the file of this patent:

UNITED STATES PATENTS

| Number | Name | Date |
|---|---|---|
| 229,130 | Hill | June 22, 1880 |
| 1,300,747 | Lloyd | Apr. 15, 1919 |
| 1,447,400 | Stoll | Mar. 6, 1923 |
| 2,360,042 | Dearborn | Oct. 10, 1944 |

FOREIGN PATENTS

| Number | Country | Date |
|---|---|---|
| 131,283 | Great Britain | Apr. 1, 1920 |

OTHER REFERENCES

Rosemont: Chem. Abstr., vol. 13 (1919) page 991.